United States Patent [19]

Nozaki

[11] Patent Number: 5,154,952

[45] Date of Patent: Oct. 13, 1992

[54] WEATHER STRIP FOR MOTOR VEHICLE

[75] Inventor: Masahiro Nozaki, Ama, Japan

[73] Assignee: Toyoda Gosei Co., Ltd., Nishikasugai, Japan

[21] Appl. No.: 584,101

[22] Filed: Sep. 18, 1990

[30] Foreign Application Priority Data

Oct. 18, 1989 [JP] Japan .................... 1-121933

[51] Int. Cl.⁵ .............................. E06B 7/16
[52] U.S. Cl. ........................... 428/31; 49/475; 292/DIG. 70; 296/93; 428/122; 428/358
[58] Field of Search ............ 428/31, 122, 358; 296/93; 292/DIG. 70; 49/475

[56] References Cited

U.S. PATENT DOCUMENTS

| 4,163,076 | 7/1979 | Katoh .................... 428/31 X |
| 4,365,450 | 12/1982 | Adell .................... 428/31 X |
| 4,440,814 | 4/1984 | Wolters .................... 428/31 |
| 4,478,897 | 10/1984 | Akashi et al. .................... 428/31 |
| 4,548,843 | 10/1985 | Kozuka et al. .................... 428/31 |
| 4,614,347 | 9/1986 | Kruschwitz .................... 428/122 X |
| 4,617,220 | 10/1986 | Ginster .................... 428/31 X |
| 5,035,937 | 7/1991 | Nozaki .................... 428/122 |

FOREIGN PATENT DOCUMENTS

| 3816835 | 11/1989 | Fed. Rep. of Germany ........ 296/93 |
| 60-185655 | 9/1985 | Japan . |
| 61-18537 | 1/1986 | Japan . |

Primary Examiner—Henry F. Epstein
Attorney, Agent, or Firm—Cushman, Darby & Cushman

[57] ABSTRACT

A weather strip is provided which has a base portion having a bottom surface which is to be bonded to a portion of a motor vehicle with double-sided adhesive tape. A seal portion is formed integrally with the base portion and is adapted to flexibly contact a facing member or surface of the motor vehicle. In order to conceal at least a side edge of the double-sided adhesive tape, a lip-shaped projection is provided which projects from a side edge of the base portion along a side edge of the double-sided adhesive tape. The lip-shaped projection projects by a height greater than the thickness of the double-sided adhesive tape and as an inwardly curved top or distal end.

4 Claims, 5 Drawing Sheets

WEATHER STRIP FOR MOTOR VEHICLE

BACKGROUND OF THE INVENTION

1. Field of the Invention

The present invention relates to a weather strip for sealing facing members of a motor vehicle and, more particularly, to a weather strip to be bonded to one of the two facing members with double-sided adhesive tape.

2. 2. Description of the Prior Art

In order to attach a weather strip to an edge of a door opening of a motor vehicle or a door facing the door opening, clips have been conventionally used. In the alternative a metal retainer is provided along the edge of the door opening of the motor vehicle or the door facing the door opening and the weather strip is placed in the retainer.

However, in the case of the former, there is a problem that the clips holes are likely to rust along their peripheral edges. In the case of the latter, there is the problem that the metal retainer adds to the weight of the motor vehicle.

Accordingly, recently, a double-sided adhesive tape has been used to bond the weather strip as disclosed in U.S. Pat. No. 4,614,347 and U.S. Pat. No. 4,617,220.

The surface to which the weather strip is attached is not always flat. Indeed, in many cases, it can be rough. When the double-sided adhesive tape (hereinafter "adhesive tape") is thin, it cannot deform to conform to the rough surface and some interstices are formed between the adhesive tape and the facing rough surface of the motor vehicle. As these interstices decrease the adhesion area of the adhesive tape, a sufficiently large adhesive force cannot be obtained. Accordingly, in order to obtain a sufficient large adhesive force, a thicker adhesive tape which follows the facing rough surface has been employed. By pressing the thick adhesive tape on the surface of the motor vehicle, the adhesive tape can be completely bonded to the surface without any interstices therebetween. However, as the adhesive tape is thick, gaps are formed at both side edges of the adhesive tape between the bottom surface of the weather strip and the facing surface of the motor vehicle. Accordingly, an outer side edge of the adhesive tape is exposed which causes an unfavorable appearance of the weather strip and dust, dirt, sand or the like adheres to the outer side edge of the adhesive tape.

SUMMARY OF THE INVENTION

In order to solve the above-described problems, the present inventors have endeavored to form a projection 34 at an outer side end of the base portion 31 of the weather strip 3. A bottom surface 310 of the base portion 31 is bonded to a surface 10 of a body panel 1 by a thick adhesive tape 4, as shown in FIG. 9.

It is necessary for the projection 34 to have a sufficient thickness to keep its shape. A projection 34, having a height equal to the thickness of the adhesive tape 4 can completely close the gap C1 between the bottom surface of the base portion 31 and the opposed surface 10 of the body panel 1. However, when the adhesive tape 4 is compressed during bonding, the top end of the projection 34 is pressed on the surface 10 and the weather strip 3 receives a reacting force from the surface 10, and therefore, the weather strip 3 will not be sufficiently bonded to the surface 10.

If the height of the projection 34 is less than the thickness of the adhesive tape 4, the top end of the projection 34 touches the surface 10 of the body panel 1 only when the adhesive tape 4 is compressed. But a gap C2 remains after bonding is completed.

It is therefore an object of the present invention to provide a weather strip to be bonded to a surface of a motor vehicle by a double-sided adhesive tape, which has a projection formed on at least an outer side edge of a base portion so as to completely cover the outer side edge of the adhesive tape without obstructing the bond of the weather strip to the motor vehicle.

In accordance with the present invention, the weather strip has a base portion, of which a bottom surface is to be bonded to one member with double-sided adhesive tape, a seal portion formed integrally with the base portion, which flexibly contacts with another facing member, a lip-shaped projection projecting from at least an outer side edge of the base portion on the outside of the double-sided adhesive tape so as to conceal at least one outer side edge of the double-sided adhesive tape. The projection projects by a height greater than the thickness of the double-sided adhesive tape, and a top or distalmost end of the projection is curved inwardly.

When the weather strip of the present invention is bonded to the motor vehicle, the adhesive tape is compressed and the projection which is integrally formed with the base portion is pressed on the facing surface. At this time, the inwardly curving top end of the projection deforms easily, and, accordingly, the projection receives only a small reaction force from the facing surface, and remains in close contact with the facing surface after the weather strip is bonded thereto.

DETAILED DESCRIPTION OF THE EMBODIMENTS

Figure 1:
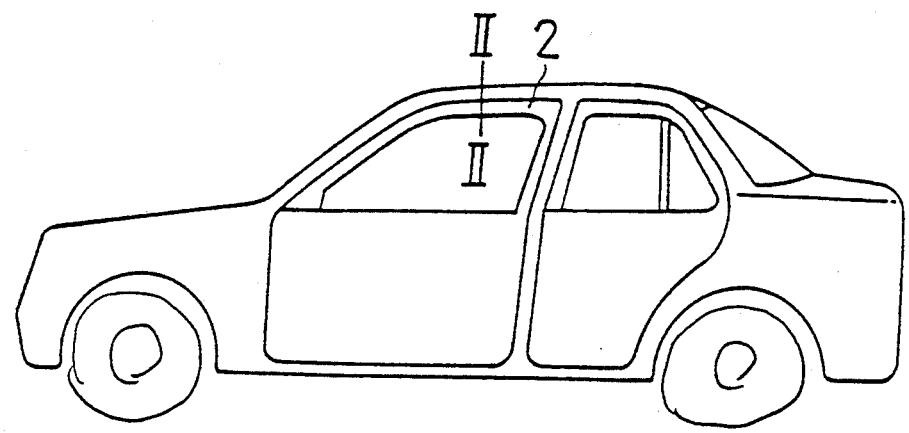
FIG. 1 is a side view of a motor vehicle to which a weather strip according to the present invention is attached.
Figure 2:
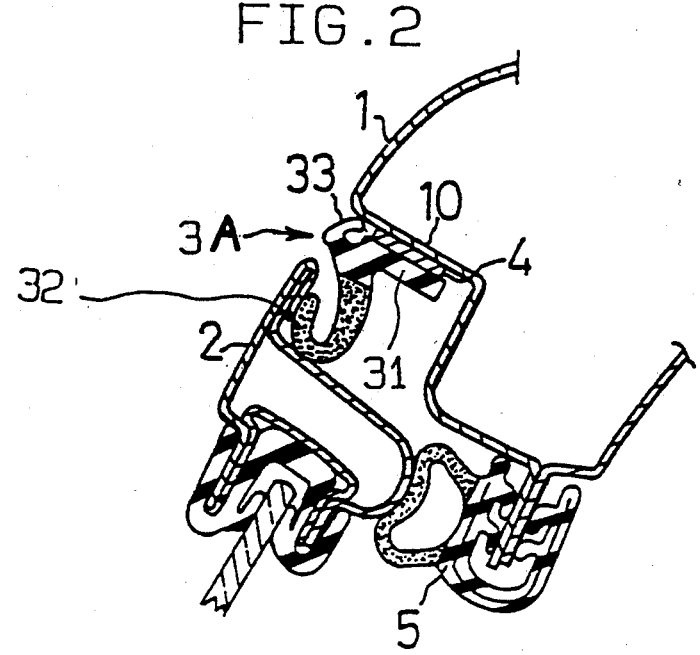
FIG. 2 is a cross-sectional view of a first embodiment of the weather strip according to the present invention, which is taken along the line II—II of FIG. 1.

FIGS. 1 to 4 illustrate a first embodiment of a weather strip according to the present invention. As shown in FIGS. 1 and 2, weather strip 3A is attached to a body panel 1 of a roof side for coming into contact with the peripheral edge of the door frame 2, and another weather strip 5 is attached to the body panel 1 on the inside of the weather strip 3A thereby providing a double seal structure.

Figure 3:
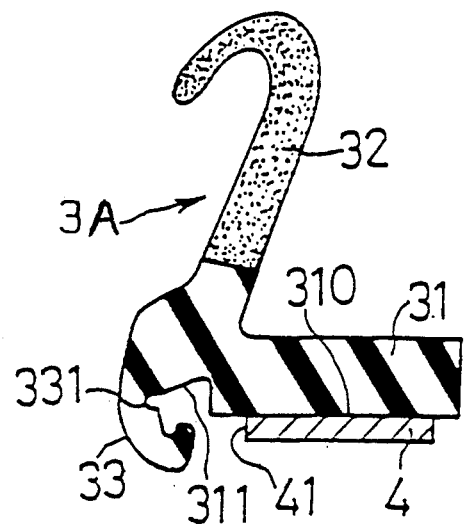
FIG. 3 is a cross-sectional view of the first embodiment of the weather strip prior to attachment to the motor vehicle.

As shown in FIG. 3 weather strip 3A has a band-shaped flat base portion 31 and a seal lip 32 having a J-shaped cross-section. A bottom surface 310 of the base portion 31 of weather strip 3A is bonded to a surface 10 (FIG. 2) of the body panel 1 by a thick adhesive tape 4. A lip-shaped projection 33 projects from an outer side edge of the base portion 31 of the weather strip 3A, and a groove 311 is formed in the bottom surface 310 between the projection 33 and the outer side edge of the base portion 31. The projection 33 extends obliquely inwardly, and the top or distal end thereof curves toward the bottom surface 310. The curving, projecting end of the projection 33 protrudes from the surface of the adhesive tape 4 which is to be bonded to the surface 10 of the body panel 1. The groove 311 has a width and a depth capable of accommodating the projection 33 which is pushed up by the surface 10 of the body panel 1. A notch 331 is formed in an inner surface of a base of the projection 33 so as to make the base flexible.

Figure 4:
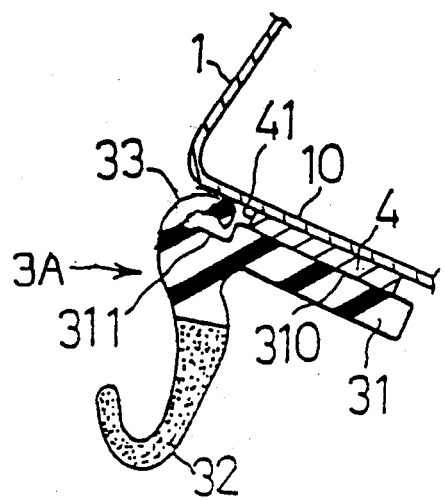
FIG. 4 is an enlarged cross-sectional view of a main portion of FIG. 2.

FIG. 4 illustrates the weather strip 3A bonded to the body panel 1. The adhesive tape 4 is previously bonded to the bottom surface 310 of the weather strip 3A. The weather strip 3A is then bonded to the surface 10 of the body panel 1 with adhesive tape 4. At this time, the outer surface of the projecting end of the projection 33 comes into contact with the surface 10, and is pressed on the surface 10 due to the compression of the adhesive tape 4. The projecting end of the projection 33, which is in contact with the surface 10, slides easily inwardly on the surface 10, and the projection 33 bends at its thin base.

When bonding is completed, the adhesive tape 4 returns to its original thickness. Since the projection 33 is long enough, the projection 33 remains in close contact with surface 10, and the edge surface 41 of the adhesive tape 4 is completely concealed by the projection 33. Therefore, the appearance around the weather strip is good, and dust, dirt, sand or the like is prevented from intruding into the inside of the projection.

The weather strip of the present invention may be attached to other places than the body panel around the door opening.

Figure 5:
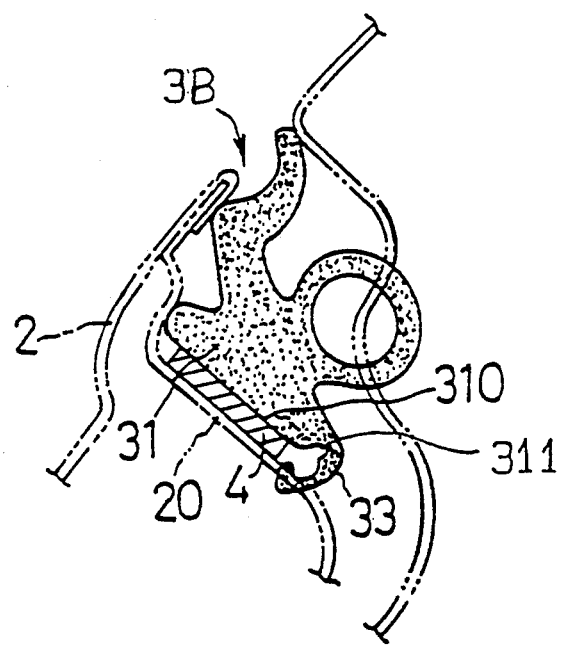
FIG. 5 is a cross-sectional view of a second embodiment of the weather strip according to the present invention.
Figure 9:
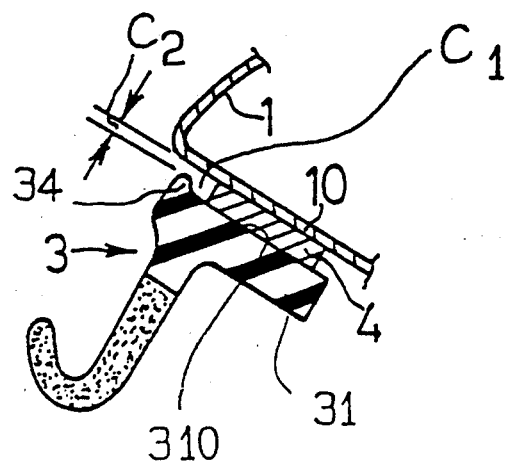
FIG. 9 is a cross-sectional view of a weather strip contemplated by the inventor during his development of the present invention.

FIG. 5 illustrates a second embodiment of the present invention. Weather strip 3B is attached to a door frame 2. Bottom surface 310 of a base portion 31 is bonded to a peripheral surface 20 of the door frame 2 by an adhesive tape 4. A lip-shaped projection 33 projects from an inner side edge of the base portion 31 by a height greater than the thickness of the adhesive tape 4 and the top end thereof curves like that of the first embodiment. A groove 311 is formed in an inner surface of the base of the projection 33.

Figure 6:
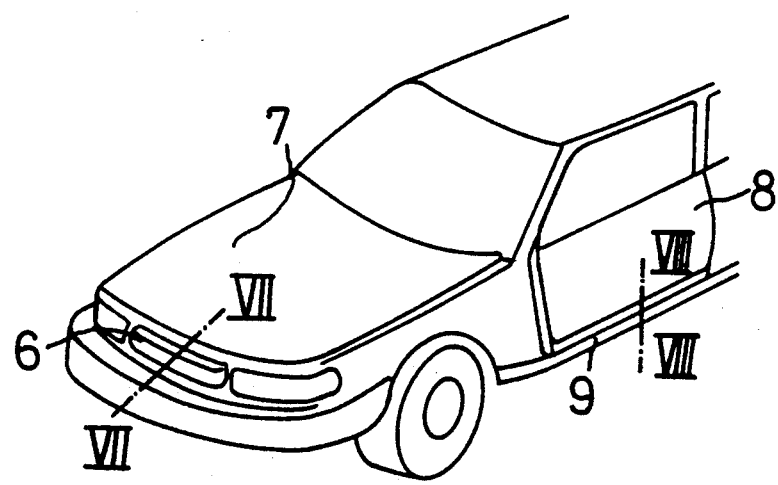
FIG. 6 is a perspective view of another motor vehicle to which the weather strip according to the present invention is attached.
Figure 7:
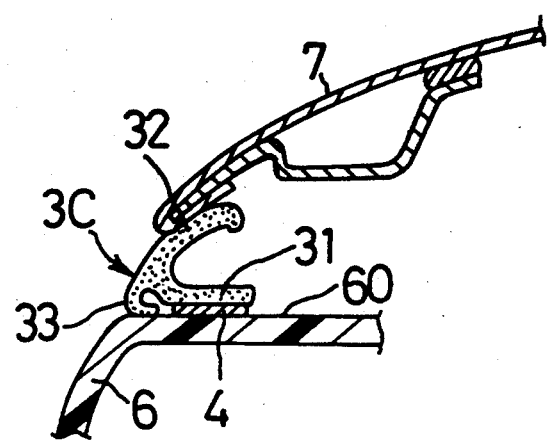
FIG. 7 is a cross-sectional view of a third embodiment of the weather strip according to the present invention, which is taken along the line VII—VII of FIG. 6.

FIG. 7 illustrates a cross-section of a third embodiment wherein the present invention is embodied in a weather strip for providing a seal between the edge around an engine compartment and the periphery of the engine hood, which is taken along the line of VII—VII of FIG. 6.

A base portion 31 of weather strip 3C is bonded to an upper surface 60 of a front wall 6 having a front grill and a head lamp by an adhesive tape 4, and a seal lip 32 comes into pressure contact with a periphery of the engine hood 7. A lip-shaped projection 33 projects from an outer side end of the base portion 31. The projection 33 extends downwardly so as to conceal the edge surface of the adhesive tape 4 and a top end of the projection 33 curves inwardly.

Figure 8:
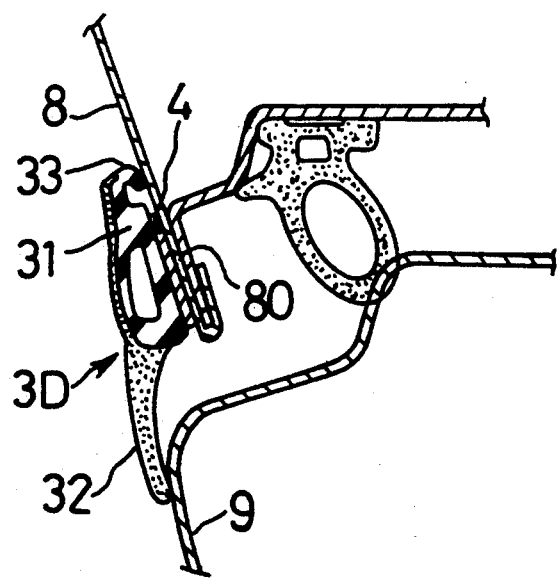
FIG. 8 is a cross-sectional view of a fourth embodiment of the weather strip according to the present invention, which is taken along the line of VIII—VIII of FIG. 6.

FIG. 8 illustrates a cross-section of a fourth embodiment wherein the present invention is applied to a weather strip for providing a seal panel, which is taken along the line of VIII—VIII of FIG. 6.

Weather strip 3D is bonded to an outer surface 80 of the lower edge of the door outer panel 8 by an adhesive tape 4, and a seal lip 32 is in pressure contact with the rocker outer panel 9. A lip-shaped projection 33 projects from an upper side edge of the base portion 31. The projection 33 extends toward the surface 80 of the door outer panel 8 so as to cover the end surface of the adhesive tape 4, and a top end of the projection 33 curves downwardly.

The second, third and fourth embodiments achieve substantially the same operational advantage as that of the first embodiment.

What is claimed is:

1. A weather strip to be bonded to one member of a motor vehicle by a double-sided adhesive tape for sealing a gap between the one member and another facing member of the motor vehicle, comprising:
    a base portion having a bottom surface to be bonded to a surface of the one member with the double-sided adhesive tape;
    a seal portion formed integrally with said base portion for coming into pressure contact with the another facing member; and
    a lip-shaped projection formed along at least one side edge of said base portion and projecting obliquely inwardly toward the surface of the one member, along at least one side edge of the double-sided adhesive tape,
    said projection having a height greater than a thickness of the double-sided adhesive tape and a distal end of said projection curving inwardly, whereby when said double-sided adhesive tape is pressed on the surface of the one member in order to bond the weather strip to the surface of the one member with the double-sided adhesive tape and, accordingly, said double-sided adhesive tape is compressed, said inwardly curving distal end slides inwardly on the surface of the one member.

2. The weather strip according to claim 1, wherein a groove is formed in said base portion between said projection and said at least one side edge of said adhesive tape for accommodating said distal end of said projection when said distal end is pushed toward the surface of the one member and slides inwardly on the surface of the one member.

3. The weather strip according to claim 1, wherein said projection has a notch in an inner surface thereof at a base thereof.

4. The weather strip according to claim 1, wherein said projection is formed at one side edge of said base portion on an outer side of the motor vehicle.

* * * * *